United States Patent
Anderson

(10) Patent No.: US 7,604,076 B2
(45) Date of Patent: Oct. 20, 2009

(54) SYSTEM AND METHOD FOR REDUCING THROTTLING LOSSES DURING REGENERATIVE BRAKING

(75) Inventor: Donald D. Anderson, Ann Arbor, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 202 days.

(21) Appl. No.: 11/676,354

(22) Filed: Feb. 19, 2007

(65) Prior Publication Data
US 2008/0200305 A1    Aug. 21, 2008

(51) Int. Cl.
*B60W 10/06* (2006.01)

(52) U.S. Cl. ............ 180/65.28; 180/65.31; 701/22

(58) Field of Classification Search ........... 180/65.2, 180/65.3, 65.8, 65.6, 168, 169, 170, 65.21, 180/65.31, 65.28; 701/96, 22, 93; 903/903, 903/910, 906
See application file for complete search history.

(56) References Cited

U.S. PATENT DOCUMENTS

| | | | |
|---|---|---|---|
| 5,608,308 A * | 3/1997 | Kiuchi et al. | 180/65.2 |
| 5,614,809 A * | 3/1997 | Kiuchi et al. | 180/65.2 |
| 5,650,713 A * | 7/1997 | Takeuchi et al. | 180/65.3 |
| 5,842,534 A * | 12/1998 | Frank | 180/65.2 |
| 5,867,009 A * | 2/1999 | Kiuchi et al. | 180/165 |
| 6,116,363 A * | 9/2000 | Frank | 180/65.2 |
| 6,209,672 B1 * | 4/2001 | Severinsky | 180/65.2 |
| 6,295,487 B1 * | 9/2001 | Ono et al. | 701/22 |
| 6,295,500 B1 * | 9/2001 | Cullen et al. | 701/93 |
| 6,304,809 B1 * | 10/2001 | Cullen et al. | 701/93 |
| 6,369,539 B1 * | 4/2002 | Morimoto et al. | 903/903 |
| 6,459,982 B1 * | 10/2002 | Kobayashi et al. | 701/93 |
| 6,470,983 B1 * | 10/2002 | Amano et al. | 180/65.2 |
| 6,490,511 B1 * | 12/2002 | Raftari et al. | 701/22 |
| 6,546,327 B2 * | 4/2003 | Hattori et al. | 701/96 |

* cited by examiner

*Primary Examiner*—Hau V Phan
(74) *Attorney, Agent, or Firm*—Ralph E. Smith

(57) ABSTRACT

A control system for a hybrid vehicle includes a regenerative braking module that controls regenerative braking of the hybrid vehicle. Regenerative braking is controlled when an accelerator device is not engaged. A throttle-by-wire control module controls a throttle valve. The throttle-by-wire control module opens the throttle valve and/or holds the throttle valve open in response to regenerative braking module signals when a transmission of the hybrid vehicle is in gear.

16 Claims, 3 Drawing Sheets

SYSTEM AND METHOD FOR REDUCING THROTTLING LOSSES DURING REGENERATIVE BRAKING

FIELD OF THE DISCLOSURE

The present disclosure relates to hybrid vehicles and more particularly to regenerative braking.

BACKGROUND OF THE DISCLOSURE

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

A hybrid electric vehicle may include an internal combustion engine and an electric motor that may operate in series or in parallel. The electric motor may be powered by a battery array and may be used to propel the vehicle at low speeds and to assist the internal combustion engine at higher speeds. The electric motor may also be driven, in part, by the internal combustion engine.

Regenerative braking occurs when the electric motor acts as a generator that recharges the battery array by recapturing kinetic energy when the vehicle is slowing or stopping. The hybrid vehicle may include both standard friction braking and regenerative braking.

In a throttle-by-wire system, a sensor detects position of an accelerator pedal of the hybrid vehicle. A vehicle control module determines a correct throttle position based on accelerator pedal sensor signals. The vehicle control module may include sub-modules that control the internal combustion engine and the electric motor based on the accelerator pedal sensor signals.

Hybrid vehicle engine efficiency may be improved by reducing pumping losses. Pumping losses refer to the energy required to pump air and fuel into an engine cylinder and to push out products of combustion. Pumping losses include losses due to throttling and losses due to aerodynamic friction. Throttling includes restricting air flow to maintain proper intake charge mass for the engine. Throttling loss is proportional to the degree of restriction of the airflow. Restriction of the airflow may be based on movement of the accelerator pedal.

SUMMARY OF THE DISCLOSURE

A control system for a hybrid vehicle includes a regenerative braking module that controls regenerative braking of the hybrid vehicle when an accelerator device is not engaged. A throttle-by-wire control module controls a throttle valve. The throttle-by-wire control module opens the throttle valve and/or holds the throttle valve open in response to regenerative braking module signals when a transmission of the hybrid vehicle is in gear.

In other features, an accelerator device sensor senses movement of the accelerator device that may be a pedal. A throttle includes the throttle valve, and an engine is responsive to control of the throttle valve. An engine control module controls fuel flow to the engine when the accelerator device is not engaged. The transmission is in gear when the transmission is in one of a reverse gear and a drive gear. An electric motor recharges a battery array during the regenerative braking. The throttle-by-wire control module at least one of fully opens the throttle valve and holds the throttle valve fully open in response to the regenerative braking module signals.

In other features, a method for controlling a hybrid vehicle system includes controlling regenerative braking of the hybrid vehicle based on acceleration commands. The method also includes shutting off fuel to an engine of the hybrid vehicle during the regenerative braking. The method also includes opening a throttle valve during the regenerative braking when a transmission of the vehicle is in gear.

In other features, the method includes sensing movement of an accelerator pedal and generating the acceleration commands based on the movement. The method also includes assisting the regenerative braking with friction braking. The method also includes recharging a battery array during the regenerative braking. The method also includes holding the throttle valve fully open until the regenerative braking ends. Opening the throttle valve includes opening the throttle valve fully. The transmission is in gear when the transmission is in one of a reverse gear and a drive gear.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION OF THE PREFERRED EMBODIMENTS

Figure 1:
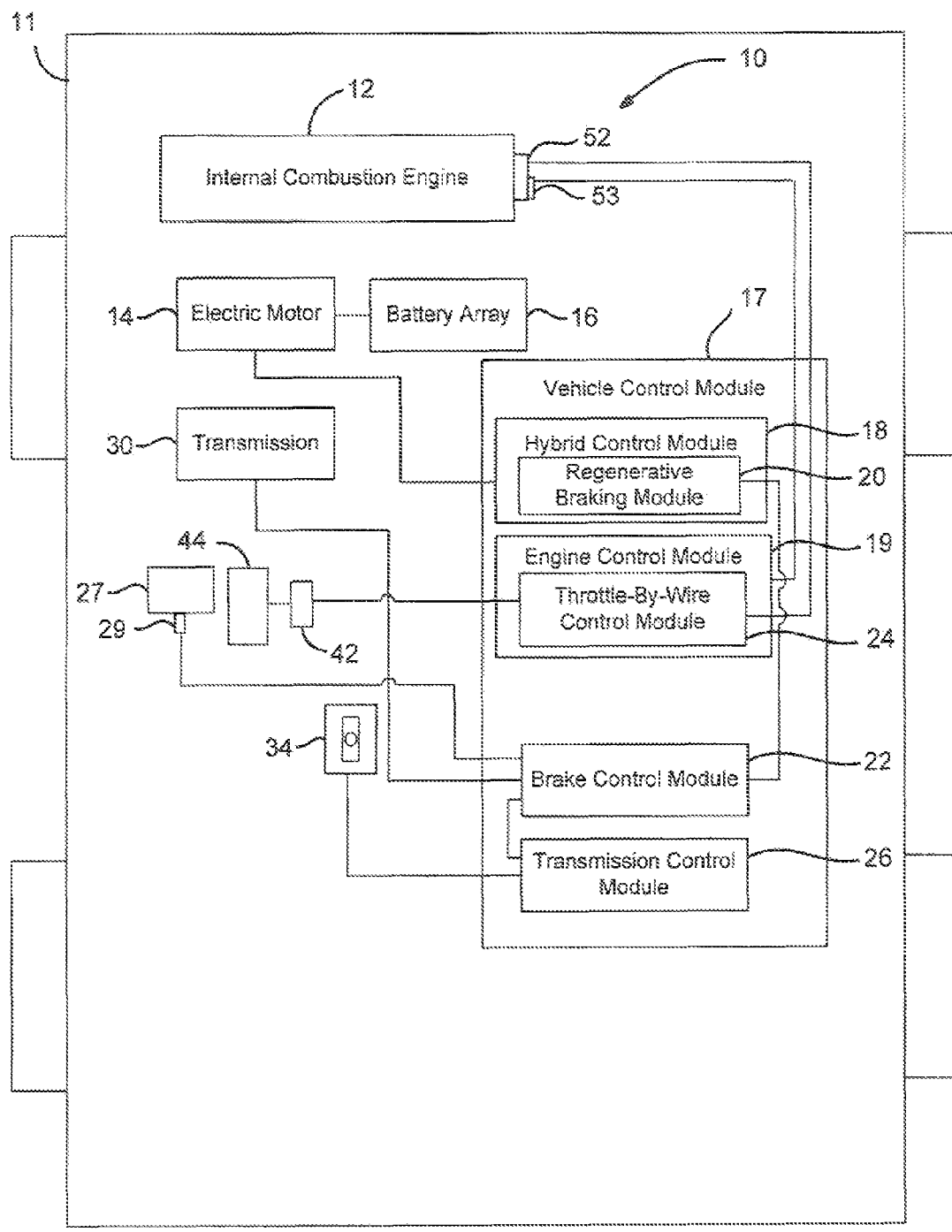
FIG. 1 is a block diagram illustrating a hybrid vehicle system in accordance with the present disclosure.

The following description is merely exemplary in nature and is in no way intended to limit the disclosure, its application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software of firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Referring now to FIG. 1, a control system 10 for a hybrid vehicle 11 may include an internal combustion engine 12 and an electric motor 14. The internal combustion engine 12 may be throttle controlled and may be powered by gasoline, diesel, or compressed natural gas. The motor 14 may include a direct current (DC) brushless generator.

The motor 14 may propel the vehicle and may be powered by a battery array 16, or may act as an electric generator that implements regenerative braking of the vehicle 11. The regenerative braking may charge the battery array 16. The battery array 16 may include, for example, deep cycle, lead-acid batteries connected in series. It should be appreciated, however, that other batteries, such as nickel cadmium, metal hydride or lithium ion, may be used and that any number of batteries can be employed, as space permits.

Both the internal combustion engine 12 and the motor 14 may be controlled by a vehicle control module 17. Communication of electronic data between various devices in the vehicle 11 may occur via a wired or wireless communication, or data, bus (not shown).

The vehicle control module 17 may include a hybrid control module 18 that controls the motor 14 and an engine control module 19 that controls the engine 12. The hybrid control module 18 may include a regenerative braking control module 20. The engine control module 19 may include a throttle-by-wire control module 24. The vehicle control module 17 may also include a brake control module 22 and a transmission control module 26.

The brake control module 22 decreases speed of the vehicle via the application of friction brakes and/or by activating the regenerative braking module 20. The friction brakes may respond to a brake pedal 27 that may include electric-, hydraulic-, or pneumatic-actuation. The regenerative braking module 20 may also control regenerative braking in response to a release of the accelerator pedal 44. The accelerator pedal sensor 42 may sense this releasing of the accelerator pedal 44 and generate a signal that may be referred to as an acceleration command signal. Regenerative braking uses kinetic energy of the moving vehicle to operate the electric motor 14 as an electric generator.

Data inputs that are utilized by the brake control module 22 and the regenerative braking module 20 may include wheel speed data, typically obtained from wheel speed sensors; and brake torque request data, obtained from any suitable sensor for sensing the extent to which the driver is depressing a brake pedal 27, for example, a stroke sensor or a pressure sensor 29. The brake control module 22 may respond to transmission control module signals that indicate whether a transmission 30 is in gear.

The multi-gear transmission 30 is selectively operable to different gears, which may include Park (P), Reverse (R), Neutral (N), and Drive (D), which may include multiple drive gears. The transmission control module 26 controls the transmission 30 based on signals from a gearshift device 34. In drive, the transmission 30 may enable the motor 14 and the engine 12 to propel the vehicle 11 in a forward direction. The vehicle may accelerate in response to pressing or releasing the accelerator pedal 44, also referred to as an accelerator device. An accelerator device may be a pedal, button, or other type of input device.

Figure 2A:
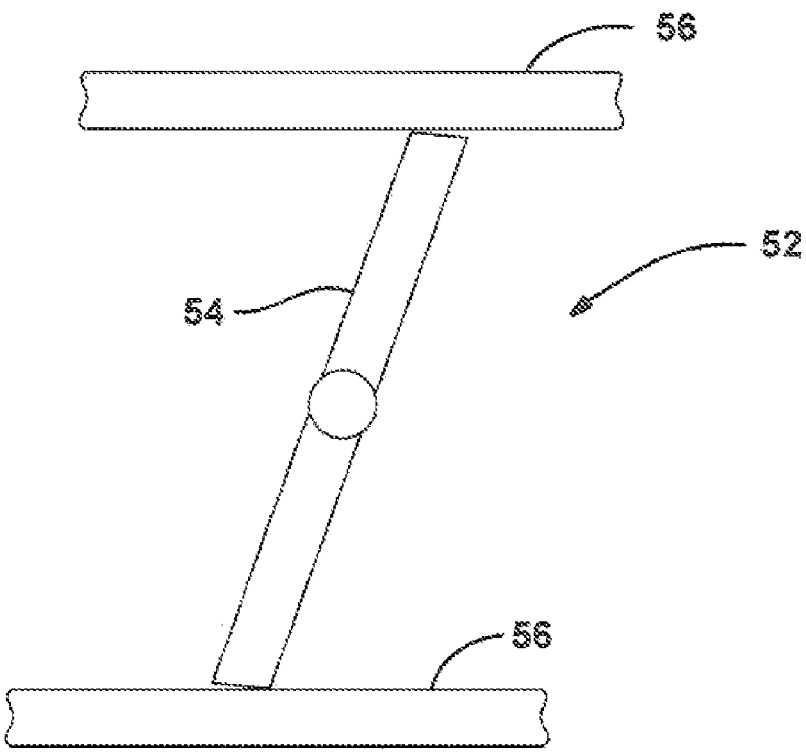
FIGS. 2A-2B are schematic diagrams illustrating operation of a throttle valve in accordance with the present disclosure.
Figure 2B:
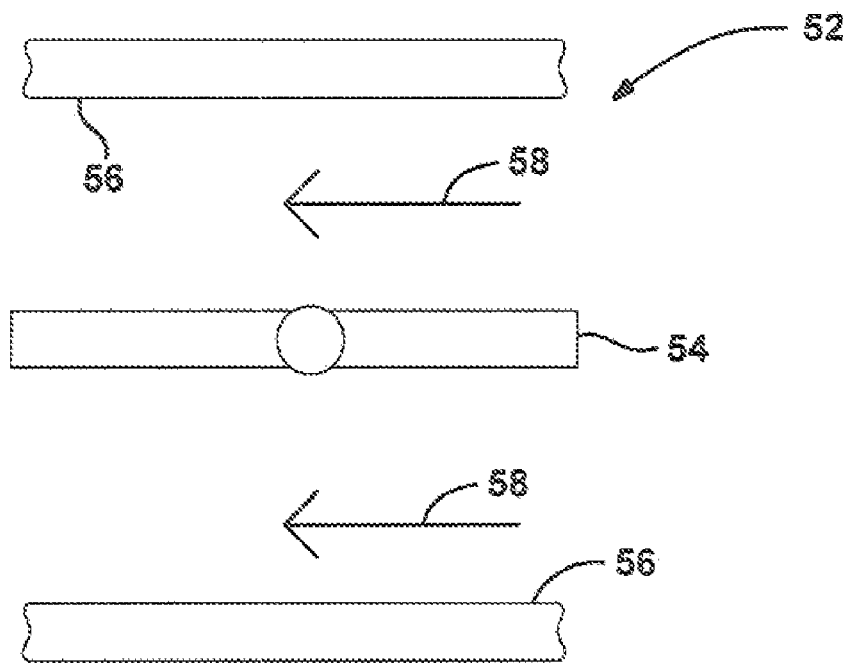

Referring now to FIGS. 2A and 2B, an accelerator pedal sensor 42, also referred to as an accelerator device sensor, may detect movement of the accelerator pedal 44. The throttle-by-wire control module 24 may control an accelerator or throttle 52 based on accelerator pedal sensor signals. When the accelerator pedal 44 is depressed fully, for example, the throttle 52 may be "wide open."

The throttle 52 directly regulates an amount of air entering the engine, indirectly controls the amount of fuel, and thus regulates internal combustion engine torque. In FIG. 2A, a throttle plate 54 inside a throttle body 56 (collectively throttle 52) is illustrated as generally closed. In FIG. 2B, when the throttle 52 is wide open, the throttle plate 54 provides a minimum of resistance for incoming air 58 to the internal combustion engine 12. Therefore, the internal combustion engine 12 intakes a maximum quantity of air and fuel. Because throttling loss is proportional to the degree of restriction of the airflow; loss may be minimal at wide open throttle.

The engine control module 19 controls the flow of air through the throttle 52 according to a function of desired output torque that may be based on accelerator pedal sensor signals. As the desired output torque changes, the engine control module 19 adjusts airflow through the throttle 52.

The engine control module 19 may close one or more fuel shut-off valves 53, which may be referred to as injectors, to the engine 12 when the accelerator pedal 44 is not engaged. This may activate a fuel shut-off mode of the engine. The fuel shut-off valves 53 may shutoff fuel to the engine 12. Generally, low to zero accelerator pedal depression and/or application of the vehicle brake pedal 27 may activate the fuel shut-off mode. When the transmission 30 is in gear, the engine 12 will be turning, which may generate throttling losses during fuel-shut off. One reason for this is because the throttle 52 may be closed during fuel-shut off.

In an exemplary embodiment of the present disclosure, the throttle-by-wire control module 24 may hold the throttle 52 partially open or wide open during fuel-shut off when the transmission 30 is in gear. If the throttle were closed, as is typical when the accelerator pedal 44 is not pressed, the vehicle would slow down/stop through engine braking. By holding the throttle open, the regenerative braking module 20 and the motor 14 may use the kinetic energy of the vehicle to charge the battery array 16, rather than wasting kinetic energy through engine braking.

Figure 3:
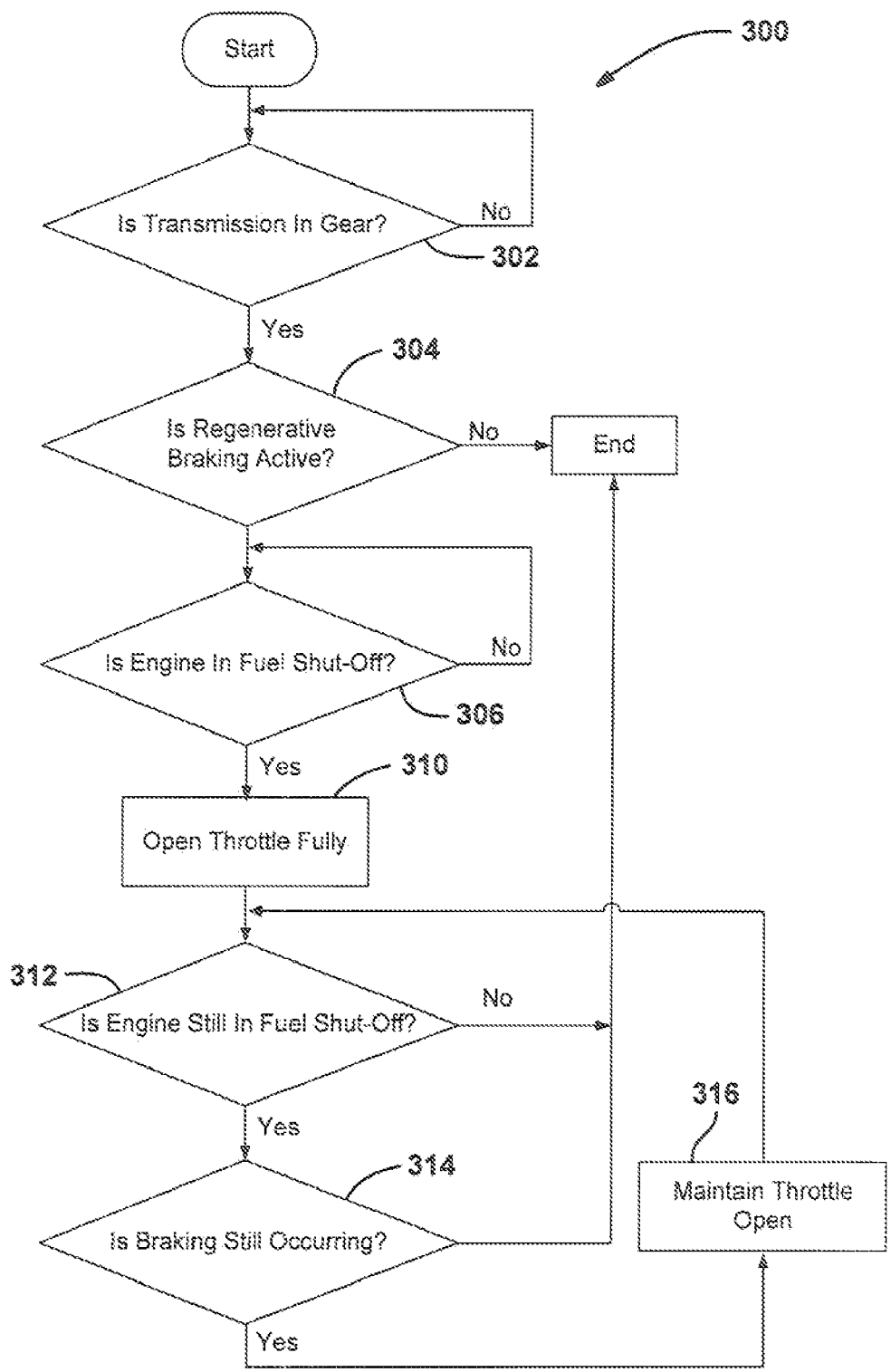
FIG. 3 is a block diagram illustrating a method for operating the hybrid vehicle system in accordance with the present disclosure.

Referring now to FIG. 3, a method 300 for operating a regenerative braking system for a hybrid vehicle is illustrated. Control starts in step 302 when the transmission is in gear. In steps 304 and 306, if the regenerative braking module is implementing regenerative braking and the fuel is shut off to the engine, then the throttle is opened fully in step 310. In steps 312 and 314, as long as the engine is in fuel shut-off and braking is occurring, the throttle is held open in step 316.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A control system for a hybrid vehicle comprising:
   a regenerative braking control module that controls regenerative braking of the hybrid vehicle when an accelerator device of the hybrid vehicle is not engaged;
   an engine control module that controls fuel flow to an engine based on a signal from the acceleration device; and
   a throttle-by-wire control module that controls a throttle valve of the engine, wherein the throttle-by-wire control module opens said throttle valve and holds said throttle valve open in response to regenerative braking module signals when a transmission of the hybrid vehicle is in gear and when said engine control module shuts off fuel to said engine.

2. The system of claim 1 wherein said accelerator device comprises an accelerator pedal.

3. The system of claim 1 further comprising:
   said transmission, wherein said transmission is in said gear when said transmission is in only one of a reverse gear and a drive gear.

4. The system of claim 1 further comprising:
   a battery array; and
   an electric motor that recharges said battery array during said regenerative braking.

5. The system of claim 1 wherein said throttle-by-wire control module fully opens said throttle valve and holds said throttle valve fully open in response to said regenerative braking module signals.

6. A control system for a hybrid vehicle comprising:
an accelerator pedal;
an accelerator pedal sensor that senses movement of said accelerator pedal;
a throttle valve;
an engine that is responsive to control of said throttle valve;
an engine control module that controls fuel flow to said engine based on accelerator pedal sensor signals;
a transmission;
a regenerative braking module that controls regenerative braking of the hybrid vehicle based on said accelerator pedal sensor signals; and
a throttle-by-wire control module that opens said throttle valve and holds said throttle valve open in response to regenerative braking module signals when said transmission is in gear and when said engine control module shuts off fuel to said engine.

7. The system of claim 6 wherein said transmission is in said gear when said transmission is in only one of a reverse gear and a drive gear.

8. The system of claim 6 further comprising:
a battery array; and
an electric motor that recharges said battery array during said regenerative braking.

9. The system of claim 6 wherein said throttle-by-wire control module fully opens said throttle valve and holds said throttle valve fully open in response to said regenerative braking module signals.

10. The system of claim 6 further comprising:
friction brakes that slow the vehicle; and
a brake control module that controls said friction brakes.

11. A method for controlling a hybrid vehicle system comprising:
sensing movement of an acceleration pedal and generating acceleration commands based on said movement;
controlling regenerative braking of the hybrid vehicle based on the acceleration commands;
shutting off fuel to an engine of the hybrid vehicle during said regenerative braking; and
opening a throttle valve during said regenerative braking when a transmission of the vehicle is in gear and fuel to the engine has been shut off.

12. The system of claim 11 further comprising assisting said regenerative braking with friction braking.

13. The method of claim 11 further comprising recharging a battery array during said regenerative braking.

14. The method of claim 11 further comprising holding said throttle valve fully open until said regenerative braking ends.

15. The method of claim 11 wherein opening said throttle valve further comprising opening said throttle valve fully.

16. The system of claim 11 wherein said transmission is in said gear when said transmission is in one of a reverse gear and a drive gear.

* * * * *